Feb. 3, 1970 H. TONJES 3,492,875
SOIL SAMPLING DEVICE
Filed July 5, 1968

Henry Tonjes
INVENTOR.

BY *Lucas J. Foster*
His Atty.

United States Patent Office

3,492,875
Patented Feb. 3, 1970

1

3,492,875
SOIL SAMPLING DEVICE
Henry Tonjes, P.O. Box 188, Wisner, Nebr. 68791
Filed July 5, 1968, Ser. No. 742,827
Int. Cl. G01n 1/04
U.S. Cl. 73—424      7 Claims

ABSTRACT OF THE DISCLOSURE

A bucket that has a bottom and an open end opposite the bottom is used in soil sampling. A pad is attached to the bottom of the bucket and extends outwardly therefrom. An auger is slidably and rotatably mounted within a tube that extends through the bottom of the bucket. The soil samples are drawn through the tube by the auger and deposited in the bucket.

---

This invention pertains to soil sampling devices and more particularly to a device in which the sample is taken easily and clearly.

Formerly, it has been customary to use various types of devices to obtain soil samples for the testing of such soil to determine which fertilizer characteristics are most lacking. Such samples may be dug with a spade or taken by any number of means. However, a good sampling would require several samples, and these samples should be as uniform as possible as to the depth from which they are taken, the amount taken, etc. Also, since the number may be fairly large, the ease of taking the sample is also of interest.

By my invention I provide a device which allows easy, and relatively uniform sampling of soil in almost any type of field.

A more complete understanding of my invention in its embodiment may be had from a study of the following specification and the figures in which.

Figure 1:
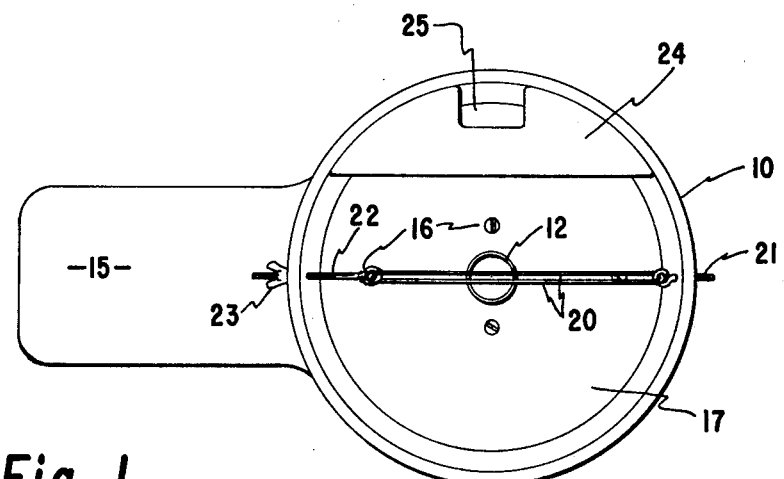
FIGURE 1 is a top plan view of the device of my invention.
Figure 2:
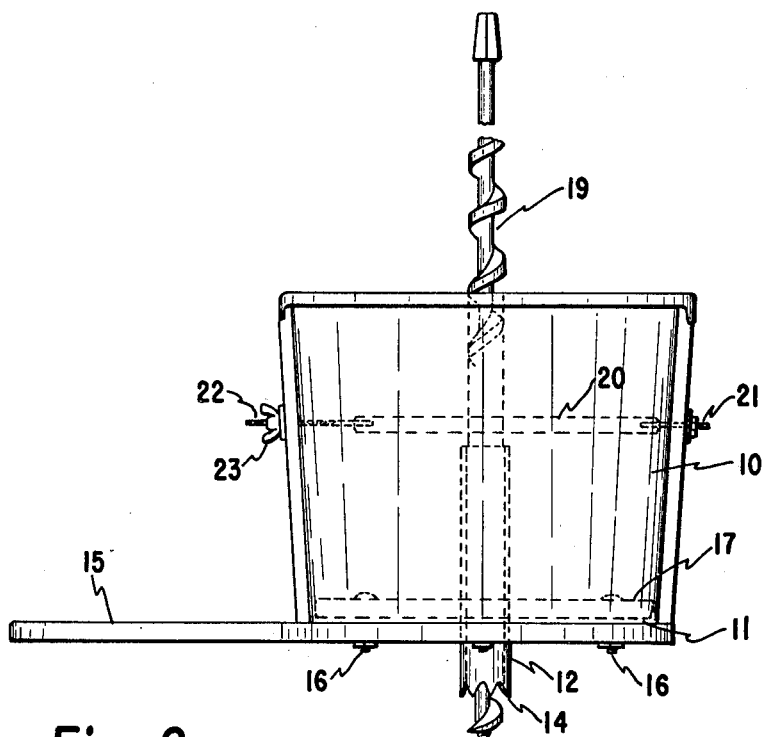
FIGURE 2 is an elevational view showing interior parts.

Briefly, my invention comprises a sampling tube having a serrated lower end for easy insertion into the ground, surrounded by a catching means which includes means for pressing the device into the soil and cleaning means for the sample taking auger.

More specifically and referring to the figures, my device includes a bucket 10 or similar container having an open top and closed bottom 11. A sampling tube 12 extends through the bottom 11 extending downwardly therefrom for a short distance. The lower end 14 of the tube is serrated as shown with relatively large serrations. This makes possible much more easy insertion of the tube into the ground, especially where there are numerous plant roots or the like, but also in case of frozen or other hardened soil.

Means for pressing the tube into the soil is provided on the container. This includes a foot pad 15 on the container 10. This pad may be formed integrally with the bottom of the container or may be fastened to the container by means of screws 16 and an interior member 17. The pad 15 itself may be formed to fit the bottom of the container except for the foot-engageable extension. The interior member 17 is formed to fit within the bucket

2

10 and to substantially cover the bottom 11. Thus, the bottom is sandwiched between the two members and may be reinforced thereby. Also, the tube 12 extends through these members and is supported by them.

An extended auger bit 19 extends through the tube 12. This auger is adapted to draw soil from the ground beneath the bucket and to bring it up through the tube 12 and deposit it into the bucket.

An auger cleaning device is also provided. This consists of a double strip 20 of rubber or similar resilient material extending over the tube 12. At one end of the strips are fixed to the bucket by an eye bolt 21 having a relatively fixed position. At the opposite end, the strips are fixed to an adjustable eye bolt 22 using a wing nut 23 to provide the adjustment. The strips 20 extend on each side of the auger and by their engagement with the flutes tend to scrape the soil from the auger so that it will be properly deposited in the bucket.

A lip 24 may be provided in the bucket 10. An opening 25 formed in the lip allows the material in the bucket to be poured out at a reasonable rate and in a definite stream so that the soil sample may be more efficiently deposited in a small container for transportation.

The operation of the device is obvious from the description: After the location from which the sample is to be taken is determined, the serrate end 14 of the tube is driven into the ground. The user of the device places one foot on the pad 15 and drives the auger 19 into the earth either with a hand brace or power unit. As the soil rises on the auger, the strips 20 scrape the excess from the auger and cause it to fall into the bucket. When a sufficiently large sample has been collected, the auger can be withdrawn from the tube, the bucket emptied into a proper container and moved to a new sampling place.

I claim:

1. A soil sampling device comprising a bucket having a bottom and an open end opposite said bottom, pad means attached to the bottom of said bucket, and extending outwardly therefrom, tube means extending from within said bucket through said bottom, auger means slidably and rotatably mounted within said tube means whereby said auger means is effective to draw samples of material through said tube to be deposited into said bucket.

2. The device of claim 1 in which said tube has one end substantially below said bottom, said end being serrated to provide easier insertion of said tube into the material to be sampled.

3. The device of claim 1 in which auger cleaning means is disposed in said bucket at a position above said tube.

4. The device of claim 3 in which said cleaning device is a pair of strips of resilient material stretched across said bucket and attached thereto at the ends of said strips.

5. The device of claim 4 in which the strips are attached to the bucket by fastening means, at least one of said fastening means being adjustable whereby the tension in said strips may be varied.

6. The device of claim 1 in which a lip means is affixed in said bucket at said open end, said lip means being formed to provide a pouring opening therethrough whereby the material in said bucket may be more accurately poured into a small container.

7. The device of claim 5 in which a lip means is affixed in said bucket at said open end, said lip means being formed to provide a pouring opening therethrough whereby the material in said bucket may be more accurately poured into a small container.

References Cited

UNITED STATES PATENTS

| | | | |
|---|---|---|---|
| 470,827 | 3/1892 | Ressler | 249—63 |
| 1,152,337 | 8/1915 | Nelson | 175—118 |
| 1,927,871 | 9/1933 | Irwin et al. | 73—425.2 |
| 3,412,814 | 11/1968 | Rosfelder | 73—425.2 XR |
| 3,447,381 | 6/1969 | Langtry et al. | 73—424 |

LOUIS R. PRINCE, Primary Examiner

H. C. POST III, Assistant Examiner

U.S. Cl. X.R.

73—425.2